US005097124A

United States Patent [19]

Devienne

[11] Patent Number: 5,097,124

[45] Date of Patent: Mar. 17, 1992

[54] APPARATUS AND PROCESS FOR THE DETECTION IN AN ATMOSPHERE TO BE MONITORED OF A CHEMICAL SUBSTANCE OF KNOWN MASS M AND WHEREOF THE DISSOCIATION FRAGMENTS ARE KNOWN

[76] Inventor: Fernand M. Devienne, Chemin des Saouves B.P.2, 06530 Peymeinade, France

[21] Appl. No.: 613,012

[22] Filed: Nov. 15, 1990

[30] Foreign Application Priority Data

Nov. 24, 1989 [FR] France ............ 89 15478

[51] Int. Cl.$^5$ ............ B01D 59/44; H01G 49/00

[52] U.S. Cl. ............ 250/283; 250/282

[58] Field of Search ............ 250/281, 282, 283, 305

[56] References Cited

U.S. PATENT DOCUMENTS

| | | | |
|---|---|---|---|
| 3,916,188 | 10/1975 | Devienne | 50/283 |
| 4,472,631 | 9/1984 | Enke et al. | 250/281 |
| 4,536,652 | 8/1985 | Cooks et al. | 250/281 |
| 4,588,889 | 5/1986 | Naito | 250/295 |
| 4,861,987 | 8/1989 | Devienne | 250/282 |

FOREIGN PATENT DOCUMENTS

| | | | |
|---|---|---|---|
| 2215874 | 1/1973 | France | 27/62 |
| 61-93544 | 12/1986 | Japan | 49/26 |
| WO83/04187 | 12/1987 | PCT Int'l Appl. | 59/44 |
| 2129607 | 5/1984 | United Kingdom | 49/26 |

OTHER PUBLICATIONS

"Hybrid Instruments for Mass Spectrometry/Mass Spectrometry", Analytical Instrumentation, vol. 15, No. 1, pp. 1-36: G. L. Glish/S. A. McLuckey.

*Primary Examiner*—Bruce C. Anderson

*Attorney, Agent, or Firm*—Kerkam, Stowell, Kondracki & Clark

[57] ABSTRACT

Process for the detection in an atmosphere to be monitored of a chemical substance of known mass M using an apparatus for the ionization of said atmosphere and for the dissociation, filtration and detection of the ions formed having in a vacuum enclosure and in said order on the path of the ions:

an ion source (1), a dissociation case (3) raised to earth potential, an electrostatic analyzer (4), a detector (5) of ions having passed through the aforementioned apparatus and characterized in that:

the voltage $V_0$ for extracting ions from the ion source (1) is fixed at a constant value;

the filtration energy level W of the electrostatic analyzer (4) is varied so as to optionally detect in the detector (5) the dissociation ion fragments $m_1, \ldots m_k$ of the substance of mass M crossing the electrostatic analyzer at energies $(m_1/M)eV_0=W_1$, $(m_2/M)\,eV_0=W_2 \ldots (mk/M)\,eV_0=Wk$ and making it posible to confirm the presence of the substance of mass M.

2 Claims, 1 Drawing Sheet

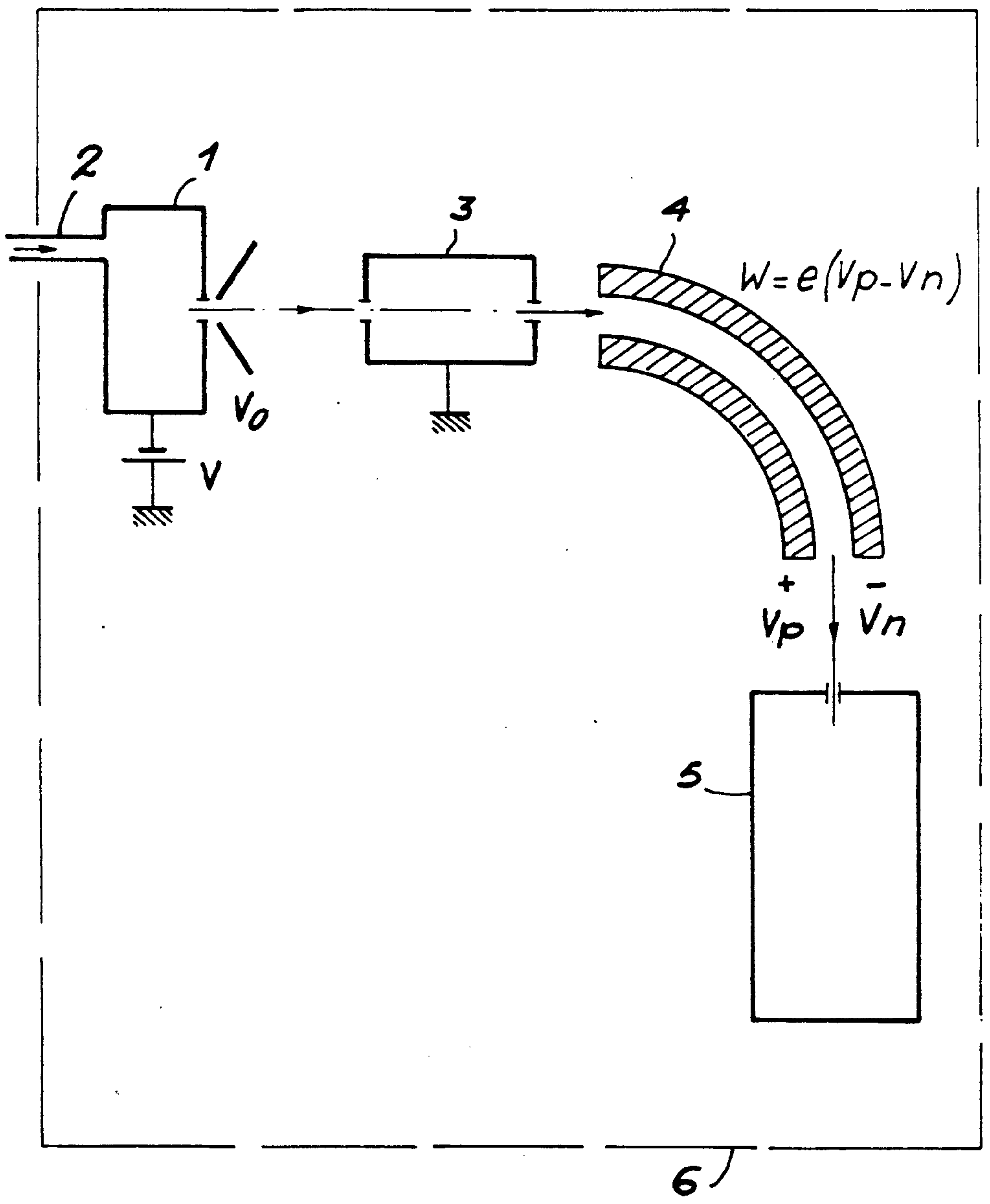
2
1
3
4
W=e(Vp-Vn)
V0
V
+
Vp
-
Vn
5
6

APPARATUS AND PROCESS FOR THE DETECTION IN AN ATMOSPHERE TO BE MONITORED OF A CHEMICAL SUBSTANCE OF KNOWN MASS M AND WHEREOF THE DISSOCIATION FRAGMENTS ARE KNOWN

BACKGROUND OF THE INVENTION

The present invention relates to the detection of chemical substances of known masses $M_i$ using an ionization, dissociation, filtration and detection apparatus successively making it possible to produce ions of the substances to be detected, their dissociation by impacts on neutral gas molecules and the seeking of dissociation fragments of known masses $m_i$ of the substances of masses $M_i$ to be identified.

Detection apparatuses and processes of this type are known and are in particular described in French patent application 8715212 of Nov. 3, 1987 in the name of the Applicant. This document teaches with the aid of an apparatus incorporating an ion source, a dissociation case, an electrostatic analyzer, a magnetic analyzer and an ion detector, a method which makes it possible to determine the presence in an atmosphere to be monitored of a chemical substance of known mass M on the basis of the examination of the dissociation fragments of also known mass $m_1, m_2, \ldots m_p$. The method fundamentally consists of identifying a sought substance of mass M by revealing the existence in the atmosphere to be monitored of a sufficiently large number of its dissociation fragments and said result is achieved by acting both on the extraction voltage for the ions at the outlet from the ion source and on the energy filtration level of the electrostatic analyzer.

BRIEF DESCRIPTION OF THE INVENTION

The thus described process is satisfactory, can be automated with the aid of data processing means, but is relatively difficult to perform with lightweight, easily transportable equipment, such as might be needed for use outside the laboratory.

The Applicant has found and this constitutes the subject matter of the present application, that it was possible to simplify both the equipment recommended in document 8715217 and the actual method for using said equipment, while retaining a quality of result which, even if not equivalent, is at least of a very high level.

The present invention therefore relates to detection processes and apparatus of a simplified nature compared with those of the aforementioned document, which can easily be put into effect and which lead to reliable results.

BRIEF DESCRIPTION OF THE DRAWING

The drawing diagrammatically illustrates an aspect of the invention.

DETAILED DESCRIPTION OF THE INVENTION

With regards to the apparatus, compared with the aforementioned prior art solution, the application recommends the elimination of the electromagnetic analyzer, while three different variants of the performance processes can be envisaged.

In the first variant, the invention relates to a process for the detection in an atmosphere to be monitored of a chemical substance of known mass M using an apparatus for ionizing said atmosphere and for dissociating, filtering and detecting the ions formed, having in a vacuum enclosure and in the indicated order on the path of the ions:

- an ion source producing from the atmosphere to be analyzed ions of the substance of mass M and unit charge e under the extraction voltage $V_0$ on the basis of a gaseous atmosphere to be analyzed, a dissociation cell raised to earth potential and filled with a neutral gas optionally heated to a temperature $\theta > 30°$ C., in which the ions of the substance of mass M are dissociated by impacts on the molecules of the neutral gas into different ion fragments of unit charge e and known masses $m_1, m_2, \ldots m_k$, characterizing the substance of mass M to be identified,
- an electrostatic analyzer (4) filtering the ions of energy W, the said energy level W being regulatable,
- a detector (5) of the ions which have passed through the aforementioned apparatus, characterized in that:
- the voltage $V_0$ for extracting ions from the ion source is fixed at a constant value;
- the filtration energy level W of the electrostatic analyzer is varied so as to optionally detect in the detector the dissociation ion fragments $m_1, \ldots m_k$ of the substance of mass M crossing the electrostatic analyzer at energies $(m_1/M)eV_0 = W_1$, $(m_2/M)\,eV_0 = W_2 \ldots (mk/M)\,eV_0 = Wk$ and making it possible to confirm that the substance of mass M is located in the analyzed atmosphere.

As has been shown, said process consists of carrying out the filtering of the dissociation fragments of mass M by solely varying the filtration energy level W of the electrostatic analyzer, the voltage $V_0$ for extracting ions from the ion source being fixed at a constant value.

The second embodiment of the invention relates to a process for the detection in an atmosphere to be monitored of a chemical substance of known mass M using an apparatus for ionizing said atmosphere and for dissociating, filtering and detecting the ions formed, having in a vacuum enclosure and in the indicated order on the path of the ions:

- an ion source producing from the atmosphere to be analyzed ions of the substance of mass M and unit charge e under the extraction voltage $V_0$ on the basis of a gaseous atmosphere to be analyzed, a dissociation cell raised to earth potential and filled with a neutral gas optionally heated to a temperature $\theta > 30°$ C., in which the ions of the substance of mass M are dissociated by impacts on the molecules of the neutral gas into different ion fragments of unit charge e and known masses $m_1, m_2, \ldots m_k$, characterizing the substance of mass M to be identified,
- an electrostatic analyzer (4) filtering the ions of energy W, the said energy level W being regulatable,
- a detector (5) of the ions which have passed through the aforementioned apparatus, characterized in that: the filtration energy of the electrostatic analyzer is fixed at a constant value $W = eV_f$,
- the extraction voltage $V_0$ is varied and in the detector is sought at least a certain number of the dissociation ion fragments $m_1, \ldots m_k$ of the substance of mass M crossing the electrostatic analyzer for values $V_{01}, V_{02}, \ldots V_{0k}$ of the extraction voltage $V_0$ such that $eV_{01}(m_1/M)=eV_f$
$eV_{02}(m_2/M)=eV_f$
$eV_{0k}(m_k/M)=eV_f$
and making it possible to confirm that the substance of mass M is located in the analyzed atmosphere.

As can be seen in this second embodiment, the filtration of the dissociation compounds of mass M is obtained by varying the voltage $V_0$ for the extraction of the ions from the ion source, but by fixing the filtration level W for the filtration energy of the electrostatic analyzer to a constant value.

Finally, in a third embodiment, which is an improvement of the previous embodiment, the sought substance of mass M is identified by the precise identification of its mass by injecting into the ion source at the same time as the atmosphere to be analyzed, a reference substance of known mass Mr and giving rise to the formation of numerous identical dissociation fragments or of the same masses as the dissociation fragments $m_1, m_2, \ldots m_k$ of the substance of sought mass M, the mass M being calculated accurately on the basis of the extraction voltages $V_{0r}$ (reference) and $V_0$ (substance M) for which two dissociation fragments of the same mass of the reference substance and the substance of mass M cross the electrostatic filter, by applying the equation $Mr/M=V_{0r}/V_0$ (substance M).

This third process embodiment for the same equipment consequently makes it possible, when the preceding process has made it possible to obtain a quasi-certainty regarding the presence of a compound of mass M in the atmosphere to be monitored, to strictly and precisely carry out the calculation of said mass M, thereby making its identification certain.

The inventive apparatus for the ionization, dissociation, filtration and detection of the secondary ions formed essentially comprises, placed in a vacuum enclosure and in the indicated order on the path of the ions: (cf. FIG. 1)

a) an ion source 1 producing, from a duct 2 coming from the atmosphere to be monitored, ions of the substance of mass M and unit charge e under the extraction voltage $V_0$, b) a dissociation case 3 raised to earth potential and filled with a neutral gas in which the ions of the substance of mass M dissociate by impact on the molecules of the neutral gas into different fragments of known masses $m_1, m_2, \ldots m_k$ characterizing the substance of mass M to be identified and being themselves ionized, c) an electrostatic analyzer 4, which only permits the passage of the ions of given energy W, said energy level W being regulatable and equal to $$W=qe(V_p-V_n)$$

$V_p$ and $V_n$ being the potentials $>0$ and $<0$ to which are raised the two electrodes of the analyzer and d) a detector 5 of the ions which have traversed the aforementioned apparatus.

Obviously, in order to be able to function, the preceding apparatus is placed in a vacuum enclosure indicated in dotted line form by the reference 6. The vacuum is obtained in the enclosure 6 by means of a turbomolecular pump associated with a two-stage primary pump. The collision case 3 serving as a dissociation case is filled with a neutral gas such as e.g. argon or krypton, in which the ion beam partly dissociates, said dissociation being between 1 and 15% as a function of the nature of the substances, the operating pressure and the temperature of the target gas.

The beam of secondary fragmentation ions is then partly separated in the electrostatic analyzer 4 at an energy threshold regulatable as a function of symmetrical positive and negative voltages with respect to the earth to which said two electrodes are raised. The detector 5 is usually constituted by an electron multiplier connected to a measuring apparatus when operating in analog manner, or by a counter when carrying out a simple count of the ions at the outlet of said analyzer 4.

The fact that the aforementioned equipment making it possible to perform the different processes according to the invention works without an electromagnet, unlike the prior art equipment having an electromagnetic separator, constitutes a very significant simplification, especially for applications in which the apparatus must be detachable and easily transportable.

An embodiment of the inventive processes will now be given, so as to make obvious the advantages of the three possible use methods of the apparatus described. This embodiment is given in an illustrative and non-limitative manner.

CASE 1

The first case makes it possible to illustrate the detection process according to the invention in the case where the voltage $V_0$ for extracting the ions from the ion source 1 is fixed at a constant value. The filtration and selection of the dissociation fragments M takes place by varying the filtration energy level W of the electrostatic analyzer 4. This first case seeks to detect the presence of a substance of mass $M=126$, namely methyl ethyl phsophorus fluoridate of formula $C_3H_8O_2FP$.

The mass spectrum of this substance in particular gives the molecular peak 126 on the basis of which was studied the different fragments obtained by impacts, which gives substances of masses m=98, 125, 96, 67, 68, 29 and 32 constituting the main fragments. There are other known fragments of masses m=27, 41, 47 and 81, which are not used here.

The first methods are applied by analyzing by degressive scanning of the voltage between the terminals of the analyzer starting from $V_f=8000$ volts or V and in particular the following energies are filtered:

$W=7936.5$ eV corresponding to $m_1=125$ $(m_1/M=0.99206)$
$W=6221.6$ eV corresponding to $m_2=98$ $(m_2/M=0.7777)$
$W=6095.2$ eV corresponding to $m_3=96$ $(m_3/M=0.7619)$
$W=4318$ eV corresponding to $m_4=68$ $(m_4/M=0.5397)$
$W=4253.9$ eV corresponding to $m_5=67$ $(m_5/M=0.5317)$
$W=1969.3$ eV corresponding to $m_6=31$ $(m_6/M=0.2460)$
$W=1841.3$ eV corresponding to $m_7=29$ $(m_7/M=0.2302)$
$W=2031.7$ eV corresponding to $m_8=32$ $(m_8/M=0.2540)$ instead of working by scanning at the fixed point in the program, the filtered energies W for which there would be a response and this is proved by measuring the corresponding intensities.

CASE 2

This relates to the inventive detection process in which the filtration energy of the electrostatic analyzer 4 is fixed to a constant value $W=eV_f$, i.e. by varying the extraction voltage $V_0$ the different dissociation fragmentary ions of mass M detected in the detector 5 are selected.

The choice of this operating method is generally dependent on the particular cases to be solved. Thus, as $eV_0(m/M)=eV_f$, it is of particular interest to use this process when the potential difference $V_f$ is not too small, which presupposes that the ratio m/M of the ions sought or the filtration energy levels are not too low, so that the extraction voltage $V_0$ does not become excess and does not e.g. exceed 10,000 volts.

Case 2 relates to a search for the same substance of mass M=126 as in case 1. $eV_f=2000$ eV is chosen and the following interaction voltages are obtained for successively obtaining the following values of $V_0$:

$V_1(125)=2000/0.99206=2016$ V
$V_2(98)=2000/0.7778=2571.4$ V
$V_3(96)=2000/0.7619=2625.0$ V
$V_4(68)=2000/0.5397=3705.0$ V
$V_5(67)=2000/0.5317=3761.5$ V
$V_6(31)=2000/0.2460=8130.1$ V
$V_7(29)=2000/0.2302=8688.9$ V
$V_8(32)=2000/0.2540=7874.0$ V

The different fragments of masses $m_k$ are extracted at values of $V_0$ differing sufficiently to permit easy separation thereof.

The process can be improved by taking two values for $eV_f$, e.g. here:

$eV_f=5000$ eV for $m_1/M$, $m_2/M$, $m_3/M$, $m_4/M$, $m_5/M$, then $eV_f=2000$ eV for $m_6/M$, $m_7/M$, and $m_8/M$.

If these conditions are fulfilled, this process is theoretically much more sensitive and accurate than the preceding process, because the variations of the extraction voltage $V_0$ are inversely proportional to the values of the ratio m/M for each dissociation fragment.. As these ratios are lower than unity, the separating power is higher, because the quantities of the voltages $V_0$ measured for the same ratio m/M between the first and second processes are proportional to $(M/m)^2$.

The apparatus realized according to one of the two aforementioned processes consequently makes it possible to define with a quasi-certainty the presence of a random substance of known mass M in the atmosphere, provided that said mass M is precisely known, the formula of the substance and the masses M of the main dissociation fragments due to decomposition by impacts in the collision case 3 of the primary ions M, i.e. in other words the values of the ratios m/M characterizing the sought substance.

Thus, as stated, it is the presence of an adequate number of said known fragments at the outlet from the electrostatic analyzer 4, which makes it possible to ensure that the presence of the substance of molecular mass M has been detected in the atmosphere to be monitored.

CASE 3

When there is no molecular peak of mass M in the mass spectrum, the reference used is a fragment of high mass m which, by association, is the origin of the dissociation fragments of lower masses m. Case 3 seeks to separate, i.e. identify two substances having a slightly different developed formula, but an identical mass. These two substances are e.g. on the one hand isopropyl methyl phonofluoridate of formula: $C_4H_{10}O_2FP$

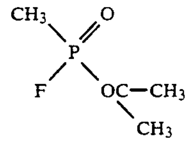

of mass 140 having no molecular peak and whose main dissociation peaks have as masses m 99, 125, 81, 43, 41, 42, 39, 47, 27, 98 and on the other hand ethyl-ethyl phosphonofluoridate of formula:

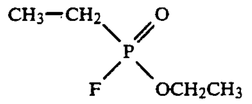

These two substances, which have the same molecular mass 140, have many dissociation products in common. However, the first has no fragments of mass 113, which is the most important dissociation fragment of the second substance and also has no fragments of mass 95, 96, 112 and 111. These substances result from the dissociation of peak 139 or peak 125.

However, the first substance has peaks 99 and 81 also resulting from the dissociation of the 125 peak.

By working on the fragment of molecular mass 125, which is a dissociation fragment common to both substances, it is merely necessary to use for the filtration voltage for the analyzer 4 the value $V_f=2000$ volts in order to obtain for the preceding peaks clearly separate values making it possible to reliably recognize either the presence of one of the two substances, or their simultaneous presence.

This second process for utilizing the apparatus according to the invention has several advantages compared with the first, which consisted simply of carrying out a sampling of the voltage of the electrostatic analyzer. Thus, with said process it is possible to obtain a greater filtration intensity, i.e. a higher sensitivity and it is also easier to accurately determine the extraction voltage $V_0$ than the voltage $V_f$ between the two electrodes of the electrostatic analyzer.

Greater certainly is obtained regarding the accuracy of the measurement by not varying the voltage between the electrodes of the electrostatic analyzer.

CASE 4

This case relates to the performance of the process in which reliable identification takes place of the sought substance of mass M by the precise determination of its mass by injecting a substance of known reference mass Mr into the mixture to be analyzed.

For example, use is made of two substances giving, by dissociation, two fragmentary ions of masses very close to one another such as $C_3H_7$ of mass m=43.054 and $C_2H_5N$ of mass m=43.045. However, there are in fact two substances, whereof one, which it is wished to identify has a mass equal to 162.057 Daltons, which gives among the dissociation fragments thereof the ion $C_2H_5N$ of mass m=43.045 and the other which is the comparison or reference substance and in this specific example isobutyl alcohol of mass M=74.072 and among whose dissociation fragments is the secondary ion $C_3H_7$ of mass 43.054. Isobutyl alcohol gives as the most important fragments masses m=43, 31, 42, 41, 33, 27, 29, 39 and 74.

By simultaneously injecting this reference substance with the substance whose presence is sought in the atmosphere and whereof the molecular mass M=162.057 is known, it is easily possible to separate these two compounds because, on still fixing the value $V_f$ of the voltage between the two electrodes of the electrostatic analyzer 4 at 2000 V, the fragment of mass 43.054 will be extracted for a voltage $V=162.057/43.054\times2000=7529.7$ V, whereas the other fragment of mass 43.045 will be extracted for an extraction voltage:

$$V_0=74.072/43.045\times2000=3440.9 \text{ V}.$$

Although having virtually identical masses, the two dissociation fragments will be perfectly separated and will permit, on obtaining both simultaneously, a confirmation of the presence of the substance of mass M=162.057 Daltons in the atmosphere to be analyzed. Thus, $$M=74.072\times7529.7/3440.9=162.09.$$

It is possible and of interest in certain cases to use two reference substances simultaneously.

I claim:

1. Process for the detection in an atmosphere to be monitored of a chemical substance of known mass M using an apparatus for ionizing said atmosphere and for dissociating, filtering and detecting the ions formed in a vacuum enclosure and in the indicated order:

producing from the atmosphere ions of the substance of mass M and unit charge e under the extraction voltage $V_O$ on the basis of a gaseous atmosphere to be analyzed;

raising a dissociation cell to earth potential;

filling the dissociation cell with a neutral gas optionally heated to a temperature $\ominus>30°$ C., in which the ions of the substance of mass M are dissociated by impact on the molecules of the neutral gas into different ion fragments of unit charge e and known masses $m_1, m_2, \ldots m_k$, characterizing the substance of mass M to be identified;

filtering the ions of energy W in an electrostatic analyzer;

detecting the ions passing through the analyzer;

maintaining the voltage $V_O$ at a constant value;

varying the filtration energy level W of the electrostatic analyzer so as to optionally detect in the detector the dissociation ion fragments $m_1, \ldots m_k$ of the substance of mass M crossing the electrostatic analyzer at energies $(m_1/M)eV_O=W_1$, $(m_2/M)\ eV_O=W_2 \ldots (mk/M)\ eV_O=Wk$.

2. Detection process according to claim 1, characterized in that the sought substance of mass M is identified by the precise identification of its mass by injecting into the ions of mass M at the same time as the atmosphere to be analyzed, a reference substance of known mass Mr and giving rise to the formation of numerous identical dissociation fragments of the same masses as the dissociation fragments $m_1, m_2, \ldots m_k$ of the substance of sought mass M, calculating the mass M accurately on the basis of the extraction voltages $V_{0r}$ (reference) and $V_0$ (substance M) for which two dissociation fragments of the same mass as the reference substance and the substance of mass M cross the electrostatic filter, by applying the equation $Mr/M=V_{0r}/V_0$ (substance M).

* * * * *